United States Patent Office 3,420,820
Patented Jan. 7, 1969

3,420,820
UNSATURATED LACTONES OF THE STEROID SERIES AND PROCESS FOR PREPARING THEM
Ulrich Stache, Hofheim, Taunus, Werner Fritsch, Neuenhain, Taunus, and Werner Haede, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Aug. 31, 1966, Ser. No. 576,243
Claims priority, application Germany, Sept. 1, 1965, F 47,055
U.S. Cl. 260—239.57                                  6 Claims
Int. Cl. C07c 173/00

ABSTRACT OF THE DISCLOSURE

Compounds of the formula where R is hydrogen or hydroxy in α-position, or wherein there may be an olefinic unsaturation or an oxido group in the 14,15-position. Process for making said compounds by reacting 20-keto, 21-hydroxy (or 21-acyloxy)-$C_{21}$ steroids with a dialkyl phosphonate in the presence of an anhydrous base.

---

It is already known to react saturated 3-oxo-steroid derivatives of the cholestane and androstane series with carbalkoxy-methyl-dialkyl phosphonates and in the presence of bases to obtain the corresponding 3-carbalkoxy-methylene-steroids (Bose et al., Tetrahedron Letters, 959 (1963); J. org. Chem. 30, 505 (1965)).

The present invention provides unsaturated lactones of the steroid series and a process for preparing them. These new steroid derivatives are obtained by reacting steroids of the C-21 series which contain in 20-position a keto group and in 21-position a hydroxy or an acyloxy group, with carbalkoxy-methyl-dialkyl phosphonates in the presence of anhydrous bases.

The process of the present invention is advantageously carried out under non prototropic reaction conditions.

According to the definition given by J. W. Baker in "Elektronentheorie der organischen Chemie" (Stuttgart 1960), pages 112–113, in a prototropic system the mobile hydrogen atom separates in the form of a proton. In the anion formed thereby, a distribution of the negative charge is caused by delocalization of the electrons so that the eliminated proton has two or more places where it can attach again. Hence, a prototropic system contains mobile hydrogen atoms. Suitable solvents are, therefore, inert solvents such as ether, dimethyl sulfoxide, dimethylformamide or aromatic or aliphatic hydrocarbons.

Suitable bases are mainly the following anhydrous bases: alkali metal or alkaline earth metal hydrides such, for example, as sodium hydride, alkali metal or alkaline earth metal amides such as, for example, sodium amide, and alkali metal triphenyl methanes such, for example, as trityl sodium, alkali metal alcoholates, especially sodium ethylate, sodium methylate or potassium tert, butylate.

It is know from J. org. Chem. 30, 505, that carbalkoxy-methyl-dialkyl phosphonates do not react with 17-keto-steroids such as oestrone-methyl ether, or with 20-keto-steroids such as pregnene-(5)-3β-ol-20-one-acetate, whereas in 5α-androstane-3,17-dione only one keto group, viz the 3-keto group, enters into reaction.

Hence, it is very surprising that in the process of the present invention, the 20-keto group in 20-keto-21-hydroxy- (or -acyloxy)-steroids reacts with carbalkoxy-methyl-dialkyl-phosphonates under formation of an unsaturated lactone ring, whereas other keto groups which may be present in 3- and/or 15-position are surprisingly not affected.

The reaction according to the present invention proceeds, for example, according to the following reaction scheme:

In the above formulae,

R represents a hydrogen atom or a low molecular weight acyl radical, $R^1$ or $R^2$ represent a hydroxy or an acyl group if the rings A and B are saturated or if they contain a Δ-linkage in 4,6- or 5,6-position, the other radical ($R^2$ or $R^1$) being in each case hydrogen, or $R^1$ and $R^2$ together represent an oxygen atom if the rings A and B are saturated or if they contain a Δ-linkage in 4,5- or 5,6-position, $R^3$ represents $R^4$ represents a hydrogen atom or a hydroxy group,
$R^5$ represents a methyl or an ethyl radical,
$R^6$ represents a saturated or unsaturated aliphatic, cycloaliphatic or araliphatic radical containing 1–12 C-atoms, and
$B^{\ominus}$ represents a base.

The steroid molecule may be provided at other places with functions which are inert toward the reaction partners, for example, a 6- or 17-alkyl group, an alkene group, for example, an isolated 9(11)- or 14(15)-double linkage, 6- or 9-halogen groups or epoxide groups, for example, a 14α, 15α, or 14β, 15β-oxido group. As starting compounds, there may be used, for example, the following steroid derivatives:

$\Delta^4$-pregnene-3,20-dione-21-ol,
$\Delta^5$-pregnene-20-one-3,20-diol,
5α-pregnane-3,20-dione-21-ol,
5β-pregnane-3,20-dione-21-ol,
5β-pregnane-20-one-3β,21-diol,
5β-$\Delta^{14(15)}$-pregnene-3,20-dione-21-ol, and similar compounds. The starting compounds may also contain hydroxy or keto groups in 14- or 15-position of the steroid molecule, the hydrogen in 14-position may also be in β-position. All hydroxy groups, including those in 21-position of the steroid, may be esterified with lower organic acids, especially with carboxylic acids. As carbalkoxymethyl dialkyl phosphonates, there are preferably used carbmethoxy-methyl-dimethyl phosphonates and carbmethoxy-methyl-diethyl phosphonates as well as carbethoxy-methyl-dimethyl phosphonates and carbethoxy-methyl-diethyl phosphonates.

As solvents, there are preferably used inert ethers, preferably diethyl ether, tetrahydrofurane, dioxane, ethylene glycol dimethyl ether, diethylene glycol dimethyl ether as well as dimethyl sulfoxide, dimethylformamide, benzene, toluene, xylene or hexane.

For carrying out the process of the invention, a mixture of 1–5 molar equivalents, preferably 1.1–1.5 molar equivalents, of the alkali metal or alkaline earth metal compound of one of the specified phosphonates is prepared from equivalent amounts of base and phosphonate in one of the indicated ethers or mixtures thereof. A solution or a suspension of 1 molar equivalent of the 21-hydroxy-20-oxo-steroid in one of the above-specified solvents is added and the reaction mixture is treated at temperatures in the range of 0° and the boiling point of the solvent used.

It is also possible to proceed in reversed order and to add the solution of the alkali compounds of the phosphonate to the solution or suspension of the steroid component. Further, it is possible to add the base to a solution or suspension of the steroid component and of the phosphonate.

The reaction time depends on the reaction temperature. In general, it amounts to a few minutes up to several hours. If the 21-hydroxy group is esterified, the reaction time may amount to up to 2 days.

The products of the invention are isolated by generally known methods. As soon as the reaction is complete, water is added to the reaction mixture, whereupon the final products partly precipitate already in solid, generally in crystalline form; they can then be easily isolated and, if necessary, purified by recrystallization. Products which separate in the form of oils are extracted with suitable solvents and, after washing with water, they are purified according to the usual methods by evaporation of the solvent.

The products of the present invention or the derivatives of theses products are distinguished by cardiotonic activity. They can be used for the treatment of cardiac diseases on account of their positively inotropic action on the myocardium. They can be administered, for example, in the form of tablets, dragés, solutions, etc., if desired in admixture with pharmaceutically usual carriers and/or stabilisers, in doses of 0.1 to 5 mg.

Furthermore, the products of the invention may be used for the preparation of other valuable steroid derivatives, especially for the synthesis of cardiac tonics with positively inotropic action.

The following examples illustrate the invention but they are not intended to limit it thereto:

Example 1.—$\Delta^{\alpha,\beta}$-β-($\Delta^5$-androstene-3β-ol-17-yl)-butenolide (a) From 21-hydroxy-pregnenolone.—A solution of 2.4 g. of carbmethoxy-methyl diethyl phosphonate in 1 ml. of tetrahydrofurane is added, while cooling with ice and stirring, to a suspension of 176 mg. of sodium hydride in 5 ml. of absolute tetrahydrofurane. The clear solution thus obtained is then combined with a still hot solution of 2.22 g. of 21-hydroxy-pregnenolone in 5 ml. of tetrahydrofurane. A gelatinous precipitate separates which dissolves upon heating to 55–60° C. After having stirred for 6 hours at 55° C., the reaction mixture, in which a new precipitate has formed, is poured into 200 ml. of water. After having allowed the reaction mixture to stand for some time, if necessary with addition of a small amount of alcohol, the crystals that have precipitated are filtered off with suction, washed with water, dried and recrystallized from a mixture of methylene chloride and ether. 2.1 g. of $\Delta^{\alpha,\beta}$-β-($\Delta^5$-androstene-3β-ol-17-yl)-butenolide melting at 256° C. (Kofler bloc) are obtained.

(b) In another experiment, an ylide solution is prepared in analogous manner from 528 mg. of sodium hydride and 7.2 g. of carbmethoxy-methyl-diethyl phosphonate in 18 ccm. of absolute tetrahydrofurane. A solution heated to about 40° C. of 6.66 g. of 21-hydroxy-$\Delta^5$-pregnene-3β-ol-20-one (=21-hydroxy-pregnene-ol-one) in 15 ccm. of absolute tetrahydrofurane is allowed to run into the aforesaid solution. The strongly positive reaction heat which develops shortly afterwards (~55° C.) is partly drawn off by cooling with a cold water bath. After having stirred for about 20–35 minutes at 55° C. to 30° C., pH measurement reveals that the pH-value which at the beginning of the reaction was at pH=11 has fallen to about pH=8–9 and that it remains constant at this range. The reaction mixture is then poured into 800 ml. of water and the whole is then further treated as described above. 6.3 g. of crude crystalline $\Delta^{\alpha,\beta}$-β-($\Delta^5$-androstene-3β-ol-17-yl)-butenolide are obtained; after recrystallization from a mixture of methylene chloride and ether, the product has the same melting point as the compound described under (a). Melting point 256° C. λmax.=214 mμ, ε=14,900. Characteristical infrared bands: 3450, 1780, 1730–1740, 1620–1630 cm.$^{-1}$.

(c) From 21-acetoxy-pregnenolone.—A solution of 2.28 g. of carbethoxy-methyl-diethyl phosphonate in 3 ml. of tetrahydrofurane is introduced, while stirring and cooling with ice, into a suspension of 215 mg. of sodium hydride in 6 ml. of tetrahydrofurane. The resulting clear solution is mixed with a solution of 3.34 g. of 21-acetoxy-pregnenolone. After standing for 24 hours at room temperature, the reaction mixture is poured into 200 ml. of water and extracted after 10 minutes with a mixture of methylene chloride and ether. After washing of the organic phase with water, drying over sodium sulfate, it is concentrated to dryness under reduced pressure. The crude product obtained is dissolved in benzene and chromatographed on a column of 80 g. of neutral aluminium oxide (Woelm). After elution with a mixture of ether and acetone (1:1) and after recrystallization of the residue from a mixture of methylene chloride and acetone, 1.05 g. of $\Delta^{\alpha,\beta}$-β-($\Delta^5$-androstene-3β-ol-17-yl)-butenolide melting at 256° C. are obtained.

Example 2.—$\Delta^{\alpha,\beta}$-β-($\Delta^4$-androstene-3-one-17-yl)-butenolide 19.2 g. of carbmethoxy-methyl-diethyl phosphonate are added portionwise, at 0° C. and while stirring, to a suspension of 1.92 g. of sodium hydride in 64 ccm. of absolute tetrahydrofurane. After termination of the evolution of H$_2$, a solution of 26.4 g. of 11-desoxy-corticosterone in 80 ccm. of absolute tetrahydrofurane is allowed to run into the aforesaid reaction mixture. The temperature, which has risen to about 40–50° C. owing to the strongly exothermic reaction heat, falls in the course of the reaction to about 30° C. (if the reaction temperature exceeds 50° C., it is advantageous to withdraw a part of the reaction heat by means of a cold water bath). Thereupon, a gelatinous mass which has separated at the beginning dissolves rapidly. After a few minutes, a part of the newly formed reaction product already precipitates. After stirring for 20–30 minutes, the reaction mixture has a weakly alkaline pH value only (pH≅8–9, at the beginning of the reaction: pH=11–12). The reaction mixture is then poured into 800 ccm. of water, the crystalline product that has precipitated is filtered off, washed with water and dried over P$_2$O$_5$ under reduced pressure.

26.5 g. of Δ$^{α,β}$-β-(Δ$^4$-androstene-3-one-17-yl)-butenolide melting at 225–230° C. are obtained; after recrystallization from a mixture of methylene chloride and ether, the compound has a melting point of 243–245° C. (yield: 21.1 g.). λmax.=224–234 mμ, ε=21,800 (broad maximum). Characteristical infrared bands: 1780, 1740, 1660–1670, 1620 1610 cm.$^{-1}$.

Example 3.—Δ$^{α,β}$-β-(Δ$^4$-androstene-15α-ol-3-one-17-yl)-butenolide 1.3 g. of carbmethoxy-methyl-diethyl phosphate in 1 ml. of tetrahydrofurane is added, while cooling with ice and stirring, to a suspension of 135 mg. of sodium hydride in 4 ml. of tetrahydrofurane. When the reaction is complete, the clear solution is combined at the boiling temperature with the almost completely dissolved amount of 1.73 g. of 15α-hydroxy-desoxycorticosterone in 50 ml. of absolute tetrahydrofurane. After a 5 minutes boiling, all is dissolved. The reaction mixture is then cooled rapidly to room temperature. After a reaction period of one hour, the reaction mixture is concentrated under reduced pressure to a volume of about 20 ml. After dilution with 150 ml. of water, the reaction mixture is extracted with ethyl acetate, washed with water and, after drying over sodium sulfate, the organic phase is evaporated to dryness. The distillation residue is taken up in methylene chloride and filtered through a short column of a small quantity of aluminium oxide (Woelm). The eluate is concentrated to dryness, the residue is recrystallized from a mixture of methylene chloride and ether. 650 mg. of Δ$^{α,β}$-β-(Δ$^4$ - androstene-15α-ol-3-one-17-yl)-butenolide melting at 234–236° C. are obtained. λmax.=224–235 mμ, ε=20,500 (broad maximum). Characteristical infrared bands: 3500, 1790, 1740, 1660–1670, 1630, 1620 cm.$^{-1}$.

Example 4.—Δ$^{α,β}$-β-(Δ$^{4,14}$-androstadiene-3-one-17-yl)-butenolide

A solution of 2.05 g. of Δ$^{4,14}$-pregnadiene-21-ol-3,20-dione (=11-desoxy-Δ$^{14}$-corticosterone) in 16 ccm. of absolute tetrahydrofurane is allowed to run into an ylide solution prepared as described in Example 2 from 155 mg. of sodium hydride and 2.1 g. of carbmethoxy-methyl-diethyl phosphonate in 9 ccm. of absolute tetrahydrofurane, whereupon a gelatinous mass precipitates immediately. After stirring for 5 minutes at room temperature and further stirring for 20 to 25 minutes at 45–50° C., the reaction mixture has a weakly alkaline pH-value of pH=8–9 only. The mixture is then poured into 300 ml. of water, the crystalline product that has precipitated is filtered off, washed with water and dried under reduced pressure over P$_2$O$_5$. 2.1 g. of Δ$^{α,β}$-β-(4,14-androstadiene-3-one-17-yl)-butenolide melting at 269–275° C. are obtained; after recrystallization from a mixture of methylene chloride and ether, the compound has a melting point of 275–278° C. λmax.=224–234 mμ, ε=21,000 (broad maximum). Characteristical infrared bands: 1780, 1740, 1660, 1630, 1620 cm.$^{-1}$.

Example 5.—Δ$^{α,β}$-β-(14α,15α-oxido-Δ$^4$-androstene-3-one-17-yl)-butenolide

An ylide solution, prepared as described in Example 2 from 10.5 mg. of sodium hydride and 200 mg. of carbmethoxy-methyl-diethyl phosphonate in 0.5 ml. of absolute tetrahydrofurane, is allowed to run into a solution of 141 mg. of 14α,15α-oxido-Δ$^4$-pregnene-21-ol-3,20-dione, melting at 192–194° C. and prepared by the addition of monoperphthalic acid to Δ$^{4,14}$-pregnadiene-21-ol-3,20-dione, in 2 ccm. of absolute tetrahydrofurane. After stirring for 25–30 minutes at room temperature, the reaction mixture has a pH-value of 8–9. The mixture is poured into about 20 ml. of water, extracted with methylene chloride, the organic phase is washed with water, the solvent is removed by distillation; a white viscous oil is obtained which is purified by a passage through a small quantity of Al$_2$O$_3$ (Woelm, activity degree II, neutral) and filtered with chloroform. After removal of the chloroform, 115 mg. of Δ$^{α,β}$-β-(14α,15α-oxido-Δ$^4$-androstene-3-one-17-yl)-butenolide are obtained in the form of a white lacquer which after several recrystallizations from a mixture of methylene chloride and ether has a melting point of 225–228° C. λmax.=224–234 mμ, ε=20,100 (broad maximum). Characteristical infrared bands: 1780, 1740–1750, 1670, 1630, 1615 cm$^{-1}$.

Example 6.—Δ$^{α,β}$-β-(Δ$^4$-androstene-3-one-17-yl)-butenolide (a) 4.5 g. of carbmethoxy-methyl-diethyl phosphonate and 725 mg. of sodium ethylate (or instead of it 575 mg. of sodium methylate or even 1.2 g. of potassium tertiary butylate) are added to a solution of 700 mg. of desoxycorticosterone in 5 ccm. of absolute dimethylformamide and the reaction mixture is stirred at room temperature. After a reaction period of about 10 minutes, a crystalline precipitate separates which, as a sample taken from the reaction mixture shows, constitutes the desired reaction product. After a reaction period of 30 minutes, the whole is poured into water, the crystalline precipitate is filtered off, washed with water and dried over P$_2$O$_5$ under reduced pressure. Δ$^{α,β}$-β-(Δ$^4$ - androstene - 3 - one-17-yl)-butenolide is obtained in the form of fine white crystals. Melting point 241–243° C.

After recrystallization from a mixture of methylene chloride and ether, the reaction product has a melting point of 243–245° C. It shows no melting point depression with the product obtained according to Example 2.

Ultraviolet and infrared dates as those indicated in Example 2.

A reaction mixture which has been prepared in corresponding manner and treated for 5 hours, yields after analogous working up crystalline Δ$^{α,β}$-β-(Δ$^4$-androstene-3-one-17-yl)- butenolide melting at 241–243° C.

(b) 2 g. of carbmethoxy-methyl-diethyl-phosphonate and 560 mg. of potassium tertiary butylate (or correspondingly 340 mg. of sodium ethylate) are added to a solution of 1.65 g. of desoxy-corticosterone in 10 ccm. of absolute dimethylformamide and the reaction mixture is stirred for 8 hours at room temperature. The reaction mixture is poured into water, the precipitate that has separated is filtered off, washed and dried. After several recrystallizations from a mixture of methylene chloride and acetone, Δ$^{α,β}$-β-(Δ$^4$-androstene-3-one - 17-yl)-butenolide is obtained in the form of fine white crystals that melt at 241–243° C.; according to the infrared and ultraviolet spectra, the compound is identical with the compound obtained according to Example 2.

In an experiment carried out in analogous manner, the reaction mixture is stirred for only 30 minutes at room temperature and treated as described above. Crystalline Δ$^{α,β}$-β-(Δ$^4$-androstene-3-one-17-yl)-butenolide melting at 241–243° C. is obtained.

We claim:
1. Compounds selected from the group consisting of
(A) a compound of the formula

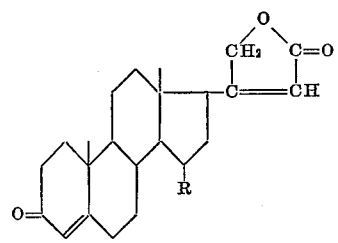

wherein R is

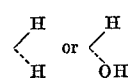

(B) a compound of the formula

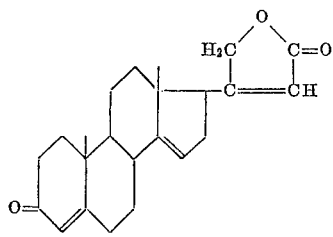

and (C) a compound of the formula

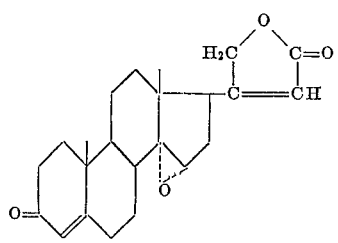

2. $\Delta^{\alpha,\beta}$-$\beta$-($\Delta^4$-androstene-3-one-17-yl)-butenolide 3. $\Delta^{\alpha,\beta}$-$\beta$-($\Delta^4$-androstene-15$\alpha$-ol - 3 - one-17-yl)-butenolide 4. $\Delta^{\alpha,\beta}$-$\beta$-($\Delta^{4,14}$-androstadiene-3-one-17-yl)-butenolide 5. $\Delta^{\alpha,\beta}$-$\beta$ - (14$\alpha$,15$\alpha$ - oxido-$\Delta^4$-androstene-3-one-17-yl)-butenolide 6. Process for preparing unsaturated lactones of the steroid series, which comprises reacting steroids of the C-21 series, which contain a keto group in 20-position and a hydroxy group or an acyloxy group in 21-position, with carbalkoxy-methyl dialkyl phosphonates in the presence of anhydrous bases.

References Cited
UNITED STATES PATENTS 2,361,965  11/1944  Ruzicka et al. ____ 260—239.57

ELBERT L. ROBERTS, *Primary Examiner.*

U.S. Cl. X.R.

260—239.55